United States Patent
Shah

(10) Patent No.: US 6,296,947 B1
(45) Date of Patent: *Oct. 2, 2001

(54) HIGH MODULUS FILM

(75) Inventor: Gautam P. Shah, Simpsonville, SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/263,651

(22) Filed: Mar. 5, 1999

(51) Int. Cl.[7] .............................. B32B 27/32; B65B 53/00
(52) U.S. Cl. .................. 428/515; 428/34.9; 428/35.1; 428/213; 428/218; 428/220; 428/332; 428/516; 428/522; 428/910; 525/220; 525/221; 525/240; 264/290.2
(58) Field of Search .................. 428/34.9, 35.1, 428/213, 218, 220, 332, 515, 516, 522, 910; 525/220, 221, 240; 264/290.2

(56) References Cited

U.S. PATENT DOCUMENTS

| 3,998,914 | * | 12/1976 | Lillis et al. ........................ 525/240 |
| 4,514,465 | * | 4/1985 | Schoenberger ..................... 428/339 |
| 4,532,189 | * | 7/1985 | Mueller ............................. 428/516 |
| 4,551,380 | * | 11/1985 | Schoenberg ....................... 428/218 |
| 4,617,241 | * | 10/1986 | Mueller ............................. 428/520 |
| 4,643,943 | * | 2/1987 | Schoenberg ....................... 428/339 |
| 4,938,828 | * | 7/1990 | Mueller et al. ................. 156/244.17 |
| 5,206,075 | * | 4/1993 | Hodgson, Jr. ..................... 428/216 |

* cited by examiner

Primary Examiner—Samuel A. Acquah
(74) Attorney, Agent, or Firm—Mark B. Quatt

(57) ABSTRACT

A film includes at least one layer comprising a blend of an ethylene polymer having a density of at least 0.925 grams per cubic centimeter, and an ethylene copolymer selected from the group consisting of ethylene/ester copolymer, and ethylene/alpha-olefin copolymer. The film is preferably substantially free from linear low density polyethylene. The film can be a monolayer or multilayer film, and can comprises a core layer comprising an ethylene polymer having a density of at least 0.925 grams per cubic centimeter; and one or more outer layers with the above described blend. At least one intermediate layer comprising an ethylene copolymer having a density of less than 0.925 grams per cubic centimeter can also be included. The film preferably has a thickness of less than 0.60 mils; a shrink force of less than 0.35 pounds in the longitudinal direction, and less than 0.30 pounds in the transverse direction; and a modulus of at least 60,000 psi in the longitudinal direction, and at least 75,000 psi in the transverse direction. The film offers beneficial properties for packaging applications.

6 Claims, 2 Drawing Sheets

FIG. 2

HIGH MODULUS FILM

FIELD OF THE INVENTION

The present invention relates to a high stiffness (high modulus) thermoplastic film which may be utilized to package a wide variety of items.

BACKGROUND OF THE INVENTION

The present invention is directed to a new and useful film. Films, and especially heat shrinkable films are well known for many packaging applications. An example is D-955 film supplied commercially by W. R. Grace. This film has proven to be very useful in packaging applications where high shrink, good optics, and other desirable features of the packaging film are needed. These additional features include impact resistance, tear initiation and tear propagation resistance. Films of this type are disclosed in U.S. Pat. Nos. 4,551,380 and 4,643,943, both to Schoenberg, incorporated herein by reference in their entirety.

It would be desirable to use heat shrinkable materials like D-955 in end use applications requiring relatively high stiffness, i.e. high modulus. One example of such an end use is on certain high speed packaging machines. Unfortunately, these films do not have sufficient stiffness to provide an optimal packaging material for such uses.

It would also be desirable to provide a material that has a reduced thickness compared to many commercial films. This would offer reduced costs in manufacture, because of the reduction in the amount of raw material used to make the film. It would also offer an environmentally attractive film because of source reduction. However, in attempting to achieve this by simply downgauging currently available films, degradation of film properties can occur. These properties include modulus (stiffness), which as already pointed out is already marginal or unacceptably low for some packaging applications; heat seal strength, and impact resistance.

It would in addition be desirable to provide a material that has a reduced shrink force compared to many commercial films. This would offer utility in packaging applications where the product to be packaged is sensitive to high shrink forces, and can be distorted by such films when heat shrunk around the product.

SUMMARY OF THE INVENTION

In one aspect, the film of the present invention comprises a layer comprising a blend of an ethylene polymer having a density of at least 0.925 grams per cubic centimeter, and an ethylene copolymer selected from the group consisting of ethylene/ester copolymer, and ethylene/alpha-olefin copolymer, said layer substantially free from linear low density polyethylene.

In a second aspect, a multilayer film comprises a core layer comprising an ethylene polymer having a density of at least 0.925 grams per cubic centimeter; and two outer layers each comprising a blend of an ethylene polymer having a density of at least 0.925 grams per cubic centimeter, and an ethylene copolymer selected from the group consisting of ethylene/ester copolymer, and ethylene/alpha-olefin copolymer, at least one of said outer layers substantially free from linear low density polyethylene.

In a third aspect, a multilayer film comprises a core layer comprising an ethylene polymer having a density of at least 0.925 grams per cubic centimeter; at least one intermediate layer comprising an ethylene copolymer having a density of less than 0.925 grams per cubic centimeter; and two outer layers each comprising a blend of an ethylene polymer having a density of at least 0.925 grams per cubic centimeter, and an ethylene copolymer selected from the group consisting of ethylene/ester copolymer, and ethylene/alpha-olefin copolymer, at least one of said outer layers substantially free from linear low density polyethylene.

In a fourth aspect, a film comprises a layer comprising a blend of an ethylene polymer having a density of at least 0.925 grams per cubic centimeter, and an ethylene copolymer selected from the group consisting of ethylene/ester copolymer, and ethylene/alpha-olefin copolymer, said film having a thickness of less than 0.50 mils.

In a fifth aspect, a film consisting essentially of a layer comprising a blend of an ethylene polymer having a density of at least. 0.925 grams per cubic centimeter, and an ethylene copolymer selected from the group consisting of ethylene/ester copolymer, and ethylene/alpha-olefin copolymer, said film having a thickness of less than 0.60 mils.

In a sixth aspect, a film comprises a layer comprising a blend of an ethylene polymer having a density of at least 0.925 grams per cubic centimeter, and an ethylene copolymer selected from the group consisting of ethylene/ester copolymer, and ethylene/alpha-olefin copolymer, said film having a shrink force of less than 0.35 pounds in the longitudinal direction, and less than 0.30 pounds in the transverse direction.

In a seventh aspect, a multilayer film comprises a core layer comprising an ethylene polymer having a density of at least 0.925 grams per cubic centimeter; and two outer layers each comprising a blend of an ethylene polymer having a density of at least 0.925 grams per cubic centimeter, and an ethylene copolymer selected from the group consisting of ethylene/ester copolymer, and ethylene/alpha-olefin copolymer, said film having a modulus of at least 60,000 psi in the longitudinal direction, and at least 75,000 psi in the transverse direction.

In an eighth aspect, a film comprises a layer comprising a blend of between 26% and 69% of an ethylene polymer having a density of at least 0.925 gm/cc, and between 31% and 74% of an ethylene copolymer selected from the group consisting of ethylene/ester copolymer and ethylene/alpha-olefin copolymer.

DEFINITIONS

The term "core layer" as used herein refers to the central layer of a multi-layer film.

The term "outer layer" as used herein refers to what is typically an outermost, usually surface layer of a multi-layer film, although additional layers and/or films can be adhered to it.

"Polymer" herein includes homopolymer, copolymer, terpolymer, etc. "Copolymer" herein includes copolymer, terpolymer, etc.

All compositional percentages used herein are calculated on a "by weight" basis.

The term "intermediate" as used herein refers to a layer of a multi-layer film which is between an outer layer and core layer of the film.

"Linear low density polyethylene" (LLDPE) as used herein has a density in the range of from about 0.916 to 0.924 grams per cubic centimeter. "Linear medium density polyethylene" (LMDPE) as used herein, has a density from 0.930 grams per cubic centimeter to 0.939 grams per cubic centimeter. "High density polyethylene" (HDPE), as defined herein, has a density of 0.94 grams per cubic centimeter or more.

The term "ethylene/ester copolymer" (E/E) as used herein refers to a copolymer formed from ethylene and an ester such as vinyl acetate, alkyl acrylate, or other monomers, wherein the ethylene derived units in the copolymer are present in major amounts and the ester derived units in the copolymer are present in minor amounts.

As used herein, the phrase "ethylene/alpha-olefin copolymer" (EAO) refers to such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER (TM) ethylene/alpha olefin copolymers supplied by Mitsui Petrochemical Corporation and metallocene-catalyzed polymers such as EXACT (TM) materials supplied by Exxon. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/alpha-olefin copolymers, such as the long chain branched homogeneous ethylene/alpha-olefin copolymers available from the Dow Chemical Company, known as AFFINITY (TM) resins, are also included as another type of ethylene/alpha-olefin copolymer useful in the present invention.

"Heat shrinkable" is defined herein as a property of a material which, when heated to an appropriate temperature above room temperature (for example 96° C.), will have a free shrink of 5% or greater in at least one linear direction.

"Layer substantially free from linear low density polyethylene" herein means that less than 50% by weight of the relevant layer comprises LLDPE, and preferably less than 40%, such as less than 30%, 20%, 10%, and 5% LLDPE. More preferably, no LLDPE is present in the relevant layer. It has been found that little or no LLDPE in the film, and in particular in one or both outer layers of the film, leads to performance benefits by the use of the present invention in packaging equipment.

BRIEF DESCRIPTION OF THE DRAWINGS

FIG. 1 is a cross-sectional view of a preferred three layered embodiment of the present invention.

FIG. 2 is a cross-sectional view of a preferred five layered embodiment of the present invention.

DESCRIPTION OF THE PREFERRED EMBODIMENTS

Figure 1:
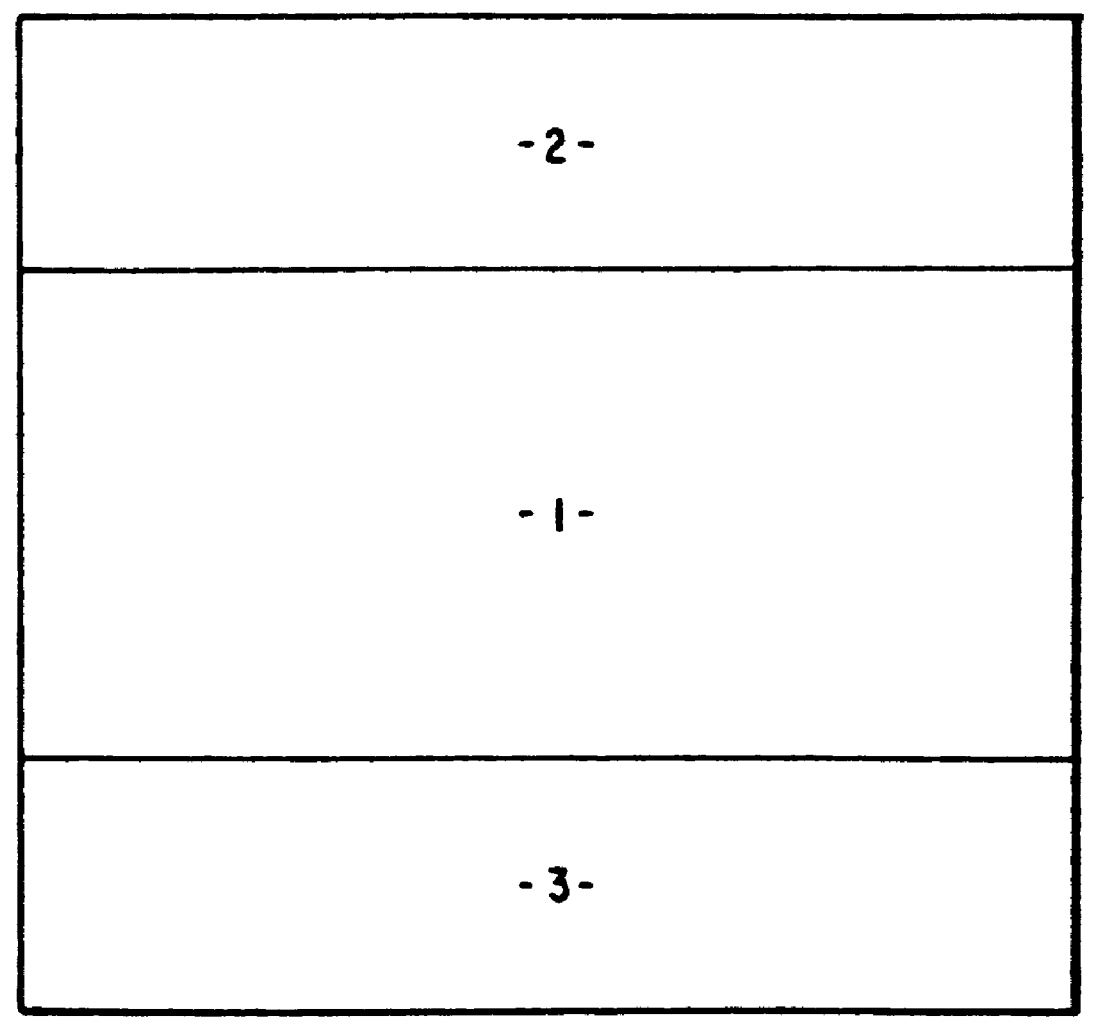

Referring to FIG. 1, which is a cross-sectional view of a preferred three layered embodiment of the present invention, it is seen that this embodiment comprises a core layer 1, and two outer layers 2 and 3. Outer layers 2 and 3 are preferably surface layers. Core layer 1 comprises an ethylene polymer having a density of at least 0.925 grams per cubic centimeter (gm/cc), preferably an ethylene/alpha-olefin copolymer with a $C_4$ to $C_{10}$ comonomer, more preferably linear medium density polyethylene. The core layer can also comprise e.g. high density polyethylene. Other polymeric materials can be included in the core layer in addition to the ethylene polymer. Examples of these additional materials are ethylene polymer or copolymer having a density of less than 0.925 gm/cc, such as LLDPE or VLDPE; and ethylene/ester copolymer, such as ethylene/vinyl ester copolymer, e.g. ethylene/vinyl acetate copolymer, or ethylene/alkyl acrylate copolymer, e.g. ethylene/ethyl acrylate copolymer, ethylene/methyl acrylate copolymer, or ethylene/butyl acrylate copolymer; or ethylene/acid copolymer, such as ethylene/acrylic acid copolymer, or ethylene/methacrylic acid copolymer. Blends of these materials in any proportion can also be used with each other, and/or with the ethylene polymer having a density of at least 0.925 gm/cc.

Outer layers 2 and 3 comprise or consist essentially of a blend of an ethylene polymer having a density of at least 0.925 gm/cc, and an ethylene copolymer selected from the group consisting of ethylene/ester copolymer, and ethylene/alpha-olefin copolymer.

The ethylene polymer having a density of at least 0.925 gm/cc can be any of the materials suitable for core layer 1. Blends of these materials in any proportion can also be used.

The ethylene/ester copolymer is preferably ethylene vinyl acetate copolymer, ethylene alkyl acrylate copolymer, or any of the materials disclosed herein as suitable for the core layer.

The ethylene/alpha olefin copolymer preferably comprises a copolymer of ethylene and a $C_4$ to $C_{10}$ comonomer. It is preferably a homogeneous ethylene/alpha-olefin copolymer, or an ethylene/alpha-olefin copolymer with a density of less than 0.916 g/cc.

The blend of outer layers 2 and 3 is preferably a blend of between 26% and 69%, more preferably between 30 and 65%, such as between 40 and 60%, or 50% of the ethylene polymer having a density of at least 0.925 gm/cc, and between 31% and 74%, more preferably between 35 and 60%, such as between 45 and 55%, or 50% of the ethylene/ester copolymer and/or ethylene/alpha-olefin copolymer.

Figure 2:
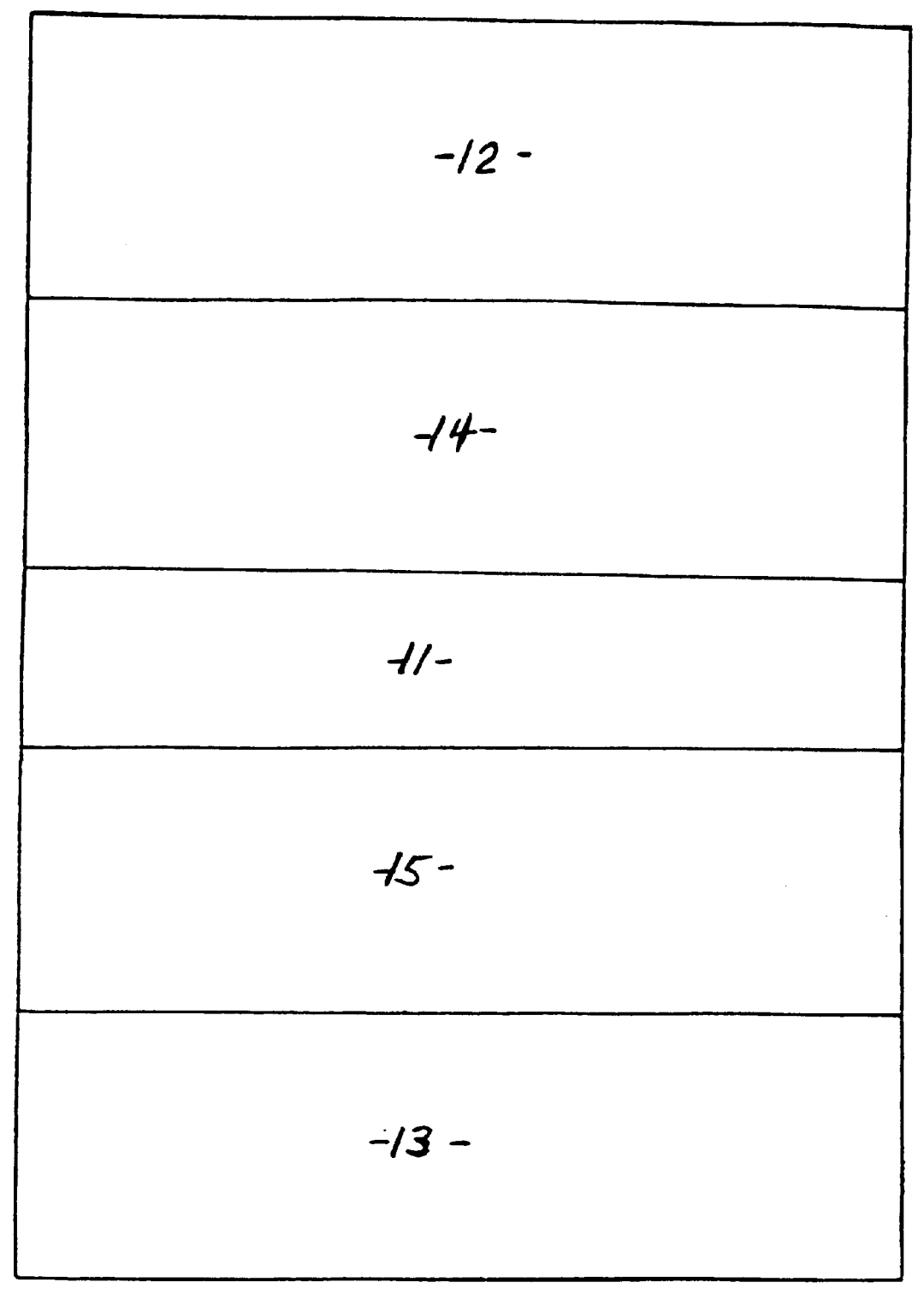

Referring to FIG. 2, which is a cross-sectional view of a preferred five layered embodiment of the present invention, it is seen that this embodiment comprises a core layer 11, two intermediate layers 12 and 13, and two outer layers 14 and 15. Outer layers 14 and 15 are preferably surface layers.

Core layer 11 comprises any of the materials described above for core layer 1.

Outer layers 12 and 13 comprise any of the materials described above for outer layers 2 and 3. Intermediate layers 14 and 15 can comprise any material that adheres the core layer 11 to outer layers 12 and 13. This can include a polymeric adhesive such as anhydride-grafted polymer, e.g anhydride-grafted LLDPE; ethylene/alpha-olefin copolymer such as LLDPE, very low density polyethylene, homogeneous ethylene/alpha-olefin copolymer, and blends thereof;

or even a conventional adhesive such as ethylene/ethyl acrylate copolymer, ethylene/methyl acrylate copolymer, or ethylene/butyl acrylate copolymer; or ethylene/acid copolymer, such as ethylene/acrylic acid copolymer, or ethylene/methacrylic acid copolymer.

The invention can be further understood by reference to the examples given below. These films can be made by a conventional cast coextrusion, lamination, or other suitable process. If desired, these films can be partially or totally crosslinked by irradiative or chemical means. If desired for a given end use, these films can be oriented by trapped bubble, tenterframe, or other suitable process. They can thereafter optionally be annealed. Final film thicknesses can vary, depending on process, end use application, etc. Typical thicknesses range from 0.1 to 20 mils.

Crosslinking by irradiation can be done by any conventional means. In the irradiation process, the film is subjected to an energetic radiation treatment, such as corona discharge, plasma, flame, ultraviolet, X-ray, gamma ray, beta ray, and high energy electron beam treatment, which induce crosslinking between molecules of the irradiated material. The irradiation of polymeric films is disclosed in U.S. Pat. No. 4,064,296, to Bornstein, et. al., which is hereby incorporated in its entirety, by reference thereto. Bornstein, et. al. disclose the use of ionizing radiation for crosslinking the polymer present in the film. Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 10–200 kGy, more preferably about 15–190 kGy, and still more preferably, 20–180 kGy. Preferably, irradiation is carried out by an electron accelerator and the dosage level is determined by standard dosimetry methods. Other accelerators such as a Vander Graff or resonating transformer may be used. The radiation is not limited to electrons from an accelerator since any ionizing radiation may be used. The ionizing radiation crosslinks the polymers in the film. The more preferred amount of radiation is dependent upon the film and its end use.

Table 1 identifies the materials used in the examples. The remaining tables describe the properties of films made with these materials.

TABLE 1

| MATERIAL | TRADENAME | SOURCE |
|---|---|---|
| $PE_1$ | Dowlex ™ 2045.04 | Dow |
| $PE_2$ | Dowlex ™ 2037 | Dow |
| $PE_3$ | | |
| $PE_4$ | SLP-8-6031 | Exxon |
| $EV_1$ | PE 1335 | Rexene |

TABLE 1-continued

| MATERIAL | TRADENAME | SOURCE |
|---|---|---|
| $EV_2$ | LD-705.15 | Exxon |
| $EV_3$ | LD-720.92 | Exxon |

$PE_1$ = LLDPE, an ethylene/ 1-octene copolymer with a density of 0.920 gm/cc and an octene-1 comonomer content of 6.5%.
$PE_2$ = LMDPE, an ethylene/ 1-octene copolymer with a density of 0.935 gm/cc. and an octene-1 comonomer content of 2.5%.
$PE_3$ = ethylene/ 1-octene copolymer with a density of 0.912 gm/cc.
$PE_4$ = ethylene/ 1-octene terpolymer with a density of 0.902 gm/cc.
$EV_1$ = ethylene/ vinyl acetate copolymer with 3.3% vinyl acetate monomer.
$EV_2$ = ethylene/ vinyl acetate copolymer with 13.3% vinyl acetate comonomer.
$EV_3$ = ethylene/ vinyl acetate copolymer with 19% vinyl acetate comonomer.

$PE_1$=LLDPE, an ethylene/1-octene copolymer with a density of 0.920 gm/cc and an octene-1 comonomer content of 6.5%.

$PE_2$=LMDPE, an ethylene/1-octene copolymer with a density of 0.935 gm/cc. and an octene-1 comonomer content of 2.5%.

$PE_3$=ethylene/1-octene copolymer with a density of 0.912 gm/cc.

$PE_4$=ethylene/1-octene terpolymer with a density of 0.902 gm/cc.

$EV_1$=ethylene/vinyl acetate copolymer with 3.3% vinyl acetate monomer.

$EV_2$=ethylene/vinyl acetate copolymer with 13.3% vinyl acetate comonomer.

$EV_3$=ethylene/vinyl acetate copolymer with 19% vinyl acetate comonomer.

In Tables 2 and 3, fourteen five-layer film structures in accordance with the invention are disclosed. These were each made by a coextrusion of the layers, and each had the structure:

A/B/C/B/A

The thickness ratio of the layers was:

| layer A | layer B | layer C | layer B | layer A |
|---|---|---|---|---|
| 2.0 | 1.5 | 3.0 | 1.5 | 2.0 |

All the films except Ex. 14 were biaxially oriented at 5×6 in the machine and transverse directions respectively. Example 14 was oriented at a 5×5 ratio. All films were irradiated at an absorbed dosage of between 80 and 95 K Gy, except Example 1 which was irradiated at about 65 K Gy. The B layers of the films were $PE_1$. The C layers of the films were $PE_2$. The A layers of the films were a blend of 50% $PE_2$, 20% of a masterbatch having 90% $PE_2$ and 10% slip and antiblock additives, and 30% of one of the materials indicated in Table 1, and identified for each example in the following tables.

TABLE 2

| Physical Property | Ex. 1 | Ex. 2 | Ex. 3 | Ex. 4 | Ex. 5 | Ex. 6 | Ex. 7 |
|---|---|---|---|---|---|---|---|
| Film thickness (gauge) | 33 | 30 | 30 | 30 | | 30 | 30 |
| third component in "A" layer | $EV_1$ | $EV_1$ | $EV_1$ | $EV_2$ | | $PE_4$ | $EV_3$ |
| Tensile @ Break$^a$ (psi × 1000) | | | | | | | |
| LD | 17.4 | 14.7 | 18.7 | 17.8 | | 18.9 | 17.3 |
| TD | 25.2 | 19.6 | 20.5 | 20.7 | | 22.6 | 20.8 |
| Elongation @ Break$^b$ (%) | | | | | | | |
| LD | 107 | 85 | 111 | 120 | | 108 | 88 |
| TD | 62 | 47 | 59 | 69 | | 59 | 53 |
| Modulus$^c$ (psi × 1000) | | | | | | | |
| LD | 94.5 | 93.9 | 100.2 | 86.6 | | 83.9 | 80.7 |
| TD | 104.7 | 115.3 | 104.5 | 101.8 | | 92.8 | 96.4 |
| Tear Propagation (gms)$^d$ | | | | | | | |
| LD | 3 | 4 | 3 | 3 | | 3 | 3 |
| TD | 2 | 2 | 2 | 2 | | 2 | 2 |
| Free Shrink$^e$ (%) | | | | | | | |
| @ 200° F. | | | | | | | |
| LD | 8 | 5 | 6 | 7 | | 6 | 7 |
| TD | 9 | 9 | 9 | 8 | | 11 | 11 |
| @ 220° F. | | | | | | | |
| LD | 12 | 10 | 12 | 12 | | 10 | 13 |
| TD | 17 | 16 | 17 | 16 | | 18 | 21 |
| @ 240° F. | | | | | | | |
| LD | 32 | 29 | 32 | 32 | | 29 | 28 |
| TD | 40 | 39 | 40 | 39 | | 39 | 38 |
| @ 260° F. | | | | | | | |
| LD | 78 | 77 | 78 | 78 | | 77 | 78 |
| TD | 81 | 81 | 82 | 82 | | 81 | 81 |
| @ 280° F. | | | | | | | |
| LD | 78 | 78 | 78 | 78 | | 78 | 78 |
| TD | 82 | 81 | 82 | 81 | | 82 | 82 |
| @ 300° F. | | | | | | | |
| LD | 78 | 78 | 78 | 78 | | 77 | 78 |
| TD | 83 | 82 | 82 | 82 | | 82 | 82 |
| Shrink Force$^f$ (pounds) | | | | | | | |
| @ 200° F. | | | | | | | |
| LD | 0.09 | 0.08 | 0.08 | 0.07 | | 0.08 | 0.08 |
| TD | 0.19 | 0.19 | 0.17 | 0.17 | | 0.20 | 0.20 |
| @ 220° F. | | | | | | | |
| LD | 0.11 | 0.09 | 0.09 | 0.08 | | 0.11 | 0.09 |
| TD | 0.23 | 0.21 | 0.21 | 0.20 | | 0.22 | 0.24 |
| @ 240° F. | | | | | | | |
| LD | 0.13 | 0.10 | 0.10 | 0.12 | | 0.13 | 0.12 |
| TD | 0.24 | 0.22 | 0.21 | 0.24 | | 0.25 | 0.13 |
| @ 260° F. | | | | | | | |
| LD | 0.13 | 0.11 | 0.11 | 0.13 | | 0.13 | 0.12 |
| TD | 0.24 | 0.20 | 0.21 | 0.22 | | 0.23 | 0.21 |
| Ball Burst Impact (cm-kg)$^g$ | 7 | 6 | 6 | 5 | | 9 | 9 |
| Instrumented Impact$^h$ (lb) | 7 | 5 | 5 | 7 | | 8 | 9 |
| Haze$^i$ (%) | 2.8 | 2.9 | 2.6 | 4.6 | | 2.1 | 5.8 |
| Clarity$^j$ (%) | 66 | 88 | 88 | 80 | | 88 | 80 |
| Gloss$^k$ 45° | 83 | 84 | 83 | 70 | | 81 | 63 |

TABLE 2-continued

| Physical Property | Ex. 1 | Ex. 2 | Ex. 3 | Ex. 4 | Ex. 5 | Ex. 6 | Ex. 7 |
|---|---|---|---|---|---|---|---|
| C.O.F.[1] (in/in) | * | * | * | * | | * | * |
| C.O.F. (out/out) | 0.34 | 0.34 | 0.37 | 0.36 | | 0.38 | 0.32 |

[a]ASTM D 882.
[b]ASTM D 882.
[c]ASTM D 882.
[d]ASTM D 1938-67.
[e]ASTM D 2732.
[f]ASTM D 2838-81.
[g]ASTM D 3420.
[h]ASTM D 3763.
[i]ASTM D 1003-61.
[j]ASTM D 1003-61.
[k]ASTM D 2457-70.
[l]ASTM D 1894.
*blocked.

TABLE 3

| Physical Property | Ex. 8 | Ex. 9 | Ex. 10 | Ex. 11 | Ex. 12 | Ex. 13 | Ex. 14 |
|---|---|---|---|---|---|---|---|
| Film thickness (gauge) | 40 | 60 | 45 | 45 | 40 | 45 | 60 |
| third component in "A" layer | $EV_1$ | $EV_1$ | $EV_1$ | $EV_1$ | $PE_4$ | $PE_4$ | $PE_4$ |
| Tensile @ Break (psi × 1000) | | | | | | | |
| LD | 17.4 | 18.5 | 20.7 | 19.4 | 18.7 | 15.9 | 19.6 |
| TD | 21.5 | 21.7 | 23.3 | 29.4 | 17.7 | 19.6 | 21.7 |
| Elongation @ Break (%) | | | | | | | |
| LD | 128 | 110 | 113 | 107 | 103 | 110 | 116 |
| TD | 59 | 92 | 68 | 58 | 96 | 80 | 91 |
| Modulus (psi × 1000) | | | | | | | |
| LD | 78.9 | 74.4 | 80.6 | 79.7 | 78.7 | 71.9 | 77.3 |
| TD | 112.7 | 86.5 | 94.6 | 115.7 | 69.6 | 86.9 | 90.3 |
| Tear Propagation (gms) | | | | | | | |
| LD | 4 | 5 | 5 | 5 | 4 | 5 | 7 |
| TD | 2 | 4 | 3 | 4 | 3 | 3 | 5 |
| Free Shrink (%) | | | | | | | |
| @ 200° F. | | | | | | | |
| LD | 7 | 8 | 8 | 9 | 6 | 6 | 7 |
| TD | 12 | 13 | 11 | 13 | 11 | 12 | 14 |
| @ 220° F. | | | | | | | |
| LD | 10 | 15 | 14 | 14 | 12 | 12 | 13 |
| TD | 20 | 23 | 21 | 21 | 21 | 20 | 23 |
| @ 240° F. | | | | | | | |
| LD | 28 | 32 | 33 | 34 | 37 | 44 | 51 |
| TD | 38 | 42 | 43 | 44 | 48 | 54 | 58 |
| @ 260° F. | | | | | | | |
| LD | 77 | 77 | 78 | 78 | 77 | 77 | 78 |
| TD | 82 | 79 | 82 | 80 | 80 | 81 | 80 |
| @ 280° F. | | | | | | | |
| LD | 78 | 78 | 78 | 78 | 77 | 77 | 78 |
| TD | 81 | 80 | 81 | 81 | 80 | 82 | 80 |
| @ 300° F. | | | | | | | |
| LD | 79 | 78 | 79 | 78 | 78 | 78 | 78 |
| TD | 82 | 80 | 82 | 82 | 82 | 82 | 80 |
| Shrink Force | | | | | | | |

TABLE 3-continued

| Physical Property | Ex. 8 | Ex. 9 | Ex. 10 | Ex. 11 | Ex. 12 | Ex. 13 | Ex. 14 |
|---|---|---|---|---|---|---|---|
| (pounds) | | | | | | | |
| @ 200° F. | | | | | | | |
| LD | 0.07 | 0.17 | 0.11 | 0.13 | 0.07 | 0.10 | 0.12 |
| TD | 0.24 | 0.36 | 0.27 | 0.27 | 0.23 | 0.23 | 0.31 |
| @ 220° F. | | | | | | | |
| LD | 0.10 | 0.20 | 0.14 | 0.16 | 0.10 | 0.08 | 0.17 |
| TD | 0.29 | 0.42 | 0.33 | 0.31 | 0.28 | 0.27 | 0.36 |
| @ 240° F. | | | | | | | |
| LD | 0.13 | 0.24 | 0.17 | 0.19 | 0.13 | 0.10 | 0.23 |
| TD | 0.30 | 0.41 | 0.39 | 0.33 | 0.29 | 0.29 | 0.39 |
| @ 260° F. | | | | | | | |
| LD | 0.12 | 0.24 | 0.16 | 0.18 | 0.13 | 0.15 | 0.22 |
| TD | 0.26 | 0.37 | 0.36 | 0.33 | 0.27 | 0.29 | 0.36 |
| Ball Burst Impact (cm-kg) | 14 | 12 | 21 | 18 | 14 | 15 | 18 |
| Instrumented Impact (lb) | 9 | 16 | 17 | 15 | 11 | 11 | 17 |
| Haze (%) | 2.8 | 3.2 | 3.1 | 3.2 | 3.4 | 3.4 | 3.6 |
| Clarity (%) | 66 | 87 | 87 | 87 | 87 | 87 | 86 |
| Gloss 45° | 86 | 86 | 85 | 86 | 77 | 74 | 82 |
| C.O.F. (in/in) | * | * | * | * | * | * | * |
| C.O.F. (out/out) | 0.33 | 0.35 | 0.31 | 0.29 | 0.34 | 0.31 | 0.30 |

*blocked.

In Table 4, five additional five-layer film structures in accordance with the invention are disclosed. These were each made by a coextrusion of the layers, and each had the structure:

A/B/C/B/A

The thickness ratio of the layers was:

| layer A | layer B | layer C | layer B | layer A |
|---|---|---|---|---|
| 1 | 1 | 1 | 1 | 1 |

All of Examples 15 to 19 were 30 gauge (0.30 mils) thick. The films of Examples 15, 16, and 17 were biaxially oriented at 5×6 in the longitudinal and transverse directions respectively. Examples 18 and 19 was oriented at a 5.5×5.5 ratio. All films were irradiated at an absorbed dosage of 61 K Gy, except Example 15 which was irradiated at about 78 K Gy. The B layers of the films were $PE_1$. The C layers of the films were $PE_2$. The A layers of the films were a blend of $PE_2$, a masterbatch (MB) having 90% $PE_2$ and 10% slip and antiblock additives, and either $EV_1$ or $PE_4$. The formulation of layer A is identified for each example in the following table.

TABLE 4

| Ex. 15 | Ex. 16 | Ex. 17 | Ex. 18 | Ex. 19 |
|---|---|---|---|---|
| 50% $PE_2$ + 10% $PE_2$ MB + 40% $EV_1$ | 50% $PE_2$ + 10% $PE_2$ MB + 40% $EV_1$ | 40% $PE_2$ + 10% $PE_2$ MB + 50% $EV_1$ | 50% $PE_2$ + 10% $PE_2$ MB + 40% $PE_4$ | 40% $PE_2$ + 10% $PE_2$ MB + 50% $PE_4$ |

In Table 5, five three-layer film structures in accordance with the invention are disclosed. These were each made by a coextrusion of the layers, and each had the structure:

A/B/A

| layer A | layer C | layer A |
|---|---|---|
| 1 | 3 | 1 |

All the films of Examples 20 to 24 were irradiated, and biaxially oriented at 5×5 (5.5×5.5 for Ex. 20) in the machine and transverse directions respectively. The C layers of the films of Examples 20 to 24 were a blend of 60% $PE_1$ and 40% $PE_2$. The A layers of the films of Examples 20 to 24 were a blend of 40% $PE_2$, 20% of a masterbatch having 86% $PE_2$ and 14% slip and antiblock additives, and 40% of one of the materials indicated in Table 1, and identified for each example in the following table. A comparative film, Comp. 1, represents D-955, having an A/B/A structure where the thickness ratio of the layers was 1/2/1, and where B comprises $PE_1$, and A comprises a blend of 50% LLDPE, 25% LMDPE, and 25% of a masterbatch comprising 90% EVA and 10% slip and antiblock additives.

TABLE 5

| Physical Property | Comp. 1 | Ex. 20 | Ex. 21 | Ex. 22 | Ex. 23 | Ex. 24 |
|---|---|---|---|---|---|---|
| Film thickness (gauge) | 60 | 30 | 40 | 30 | 30 | 40 |

TABLE 5-continued

| Physical Property | Comp. 1 | Ex. 20 | Ex. 21 | Ex. 22 | Ex. 23 | Ex. 24 |
|---|---|---|---|---|---|---|
| third component in "A" layer | — | $EV_1$ | $EV_1$ | $EV_1$ | $PE_4$ | $PE_4$ |
| Tensile @ Break (psi × 1000) | | | | | | |
| LD | 18.8 | 18.3 | 17.4 | 18.5 | 19.0 | 21.2 |
| TD | 22.4 | 20.5 | 19.0 | 20.2 | 20.6 | 21.0 |
| Elongation @Break (%) | | | | | | |
| LD | 107 | 90 | 97 | 97 | 110 | 112 |
| TD | 81 | 107 | 117 | 85 | 75 | 97 |
| Modulus (psi × 1000) | | | | | | |
| LD | 56.1 | 101.0 | 82.1 | 83.1 | 69.3 | 69.8 |
| TD | 70.8 | 105.1 | 81.6 | 93.3 | 86.2 | 78.0 |
| Tear Propagation (gms) | | | | | | |
| LD | 5 | 2 | 3 | 2 | 2 | 3 |
| TD | 5 | 2 | 3 | 2 | 3 | 4 |
| Free Shrink (%) | | | | | | |
| @220° F. | | | | | | |
| LD | 24 | 14 | 18 | 18 | 19 | 21 |
| TD | 34 | 24 | 27 | 24 | 27 | 30 |
| @240° F. | | | | | | |
| LD | 59 | 40 | 44 | 43 | 52 | 53 |
| TD | 63 | 49 | 50 | 52 | 58 | 59 |
| @260° F. | | | | | | |
| LD | 79 | 81 | 79 | 79 | 80 | 79 |
| TD | 79 | 73 | 78 | 79 | 78 | 78 |
| @280° F. | | | | | | |
| LD | 79 | 81 | 79 | 80 | 80 | 79 |
| TD | 80 | 82 | 81 | 79 | 80 | 78 |
| Instrumented Impact (lb) | 20 | 7 | 12 | 8 | 6 | 9 |
| Haze (%) | 3.6 | 4.2 | 5.4 | 4.5 | 4.6 | 4.4 |
| Clarity (%) | 79 | 86 | 84 | 86 | 86 | 86 |
| Gloss, 45° | 86 | 76 | 78 | 80 | 77 | 80 |

Additional film structure in accordance with the present invention are listed in Table 6 below. These can be monolayer films, as in examples 25 to 34, or multilayer films which include the structures shown.

TABLE 6

| EX. | FILM STRUCTURE |
|---|---|
| 25 | 10% LMDPE + 90% EVA |
| 26 | 30% LMDPE + 70% EVA |
| 27 | 50% LMDPE + 50% EVA |
| 28 | 70% LMDPE + 30% EVA |
| 29 | 90% LMDPE + 10% EVA |
| 30 | 10% LMDPE + 90% HEAO |
| 31 | 30% LMDPE + 70% HEAO |
| 32 | 50% LMDPE + 5O% HEAO |
| 33 | 70% LMDPE + 30% HEAO |
| 34 | 90% LMDPE + 10% HEAO |
| 35 | 10% LMDPE + 90% EVA/LMDPE/10% LMDPE + 90% EVA |
| 36 | 30% LMDPE + 70% EVA/LMDPE/30% LMDPE + 70% EVA |
| 37 | 50% LMDPE + 50% EVA/LMDPE/50% LMDPE + 50% EVA |
| 38 | 70% LMDPE + 30% EVA/LMDPE/70% LMDPE + 30% EVA |
| 39 | 90% LMDPE + 10% EVA/LMDPE/90% LMDPE + 10% EVA |
| 40 | 10% LMDPE + 90% HEAO/LMDPE/10% LMDPE + 90% HEAO |
| 41 | 30% LMDPE + 70% HEAO/LMDPE/30% LMDPE + 70% HEAO |
| 42 | 50% LMDPE + 50% HEAO/LMDPE/50% LMDPE + 50% HEAO |
| 43 | 70% LMDPE + 30% HEAO/LMDPE/70% LMDPE + 30% HEAO |
| 44 | 90% LMDPE + 10% HEAO/LMDPE/90% LMDPE + 10% HEAO |
| 45 | 10% LMDPE + 90% EVA/LLDPE/LMDPE/LLDPE/10% LMDPE + 90% EVA |
| 46 | 30% LMDPE + 70% EVA/LLDPE/LMDPE/LLDPE/30% LMDPE + 70% EVA |
| 47 | 50% LMDPE + 50% EVA/LLDPE/LMDPE/LLDPE/50% LMDPE + 50% EVA |
| 48 | 70% LMDPE + 30% EVA/LLDPE/LMDPE/LLDPE/70% LMDPE + 30% EVA |
| 49 | 90% LMDPE + 10% EVA/LLDPE/LMDPE/LLDPE/90% LMDPE + 10% EVA |
| 50 | 10% LMDPE + 90% HEAo/LLDPE/LMDPE/LLDPE/10% LMDPE + 90% HEAO |
| 51 | 30% LMDPE + 70% HEAO/LLDPE/LMDPE/LLDPE/30% LMDPE + 70% HEAO |
| 52 | 50% LMDPE + 50% HEAO/LLDPE/LMDPE/LLDPE/50% LMDPE + 50% HEAO |
| 53 | 70% LMDPE + 30% HEAO/LLDPE/LMDPE/LLDPE/70% LMDPE + 30% HEAO |

TABLE 6-continued

| EX. | FILM STRUCTURE |
|---|---|
| 54 | 90% LMDPE + 10% HEAO/LLDPE/LMDPE/LLDPE/90% LMDPE + 10% HEAO |
| 55 | 10% HDPE + 90% EVA/HDPE/10% HDPE + 90% EVA |
| 56 | 30% HDPE + 70% EVA/HDPE/30% HDPE + 70% EVA |
| 57 | 50% HDPE + 50% EVA/HDPE/50% HDPE + 50% EVA |
| 58 | 70% HDPE + 30% EVA/HDPE/70% HDPE + 30% EVA |
| 59 | 90% HDPE + 10% EVA/HDPE/90% HDPE + 10% EVA |
| 60 | 10% HDPE + 90% HEAO/HDPE/10% HDPE + 90% HEAO |
| 61 | 30% HDPE + 70% HEAO/HDPE/30% HDPE + 70% HEAO |
| 62 | 50% HDPE + 50% HEAO/HDPE/50% HDPE + 50% HEAO |
| 63 | 70% HDPE + 30% HEAO/HDPE/70% HDPE + 30% HEAO |
| 64 | 90% HDPE + 10% HEAO/HDPE/90% HDPE + 10% HEAO |
| 65 | 10% HDPE + 90% EVA/LLDPE/HDPE/LLDPE/10% HDPE + 90% EVA |
| 66 | 30% HDPE + 70% EVA/LLDPE/HDPE/LLDPE/30% HDPE + 70% EVA |
| 67 | 50% HDPE + 50% EVA/LLDPE/HDPE/LLDPE/50% HDPE + 50% EVA |
| 68 | 70% HDPE + 30% EVA/LLDPE/HDPE/LLDPE/70% HDPE + 30% EVA |
| 69 | 90% HDPE + 10% EVA/LLDPE/HDPE/LLDPE/90% HDPE + 10% EVA |
| 70 | 10% HDPE + 90% HEAO/LLDPE/HDPE/LLDPE/10% HDPE + 90% HEAO |
| 71 | 30% HDPE + 70% HEAO/LLDPE/HDPE/LLDPE/30% HDPE + 70% HEAO |
| 72 | 50% HDPE + 50% HEAO/LLDPE/HDPE/LLDPE/50% HDPE + 50% HEAO |
| 73 | 70% HDPE + 30% HEAO/LLDPE/HDPE/LLDPE/70% HDPE + 30% HEAO |
| 74 | 90% HDPE + 10% HEAO/LLDPE/HDPE/LLDPE/90% HDPE + 10% HEAO |

Some films of the present invention have a relatively low shrink and are especially useful in "soft shrink" applications where sensitive products are to be packaged.

This is because although such films of the present invention can have shrink tensions similar to thicker gauged films, their shrink force can be considerably less because of their thinner construction.

Preferred shrink force values for films of the invention are less than 0.35 in the longitudinal direction, preferably less than 0.30, such as less than 0.25, 0.20, 0.15, and 0.10; and less than 0.30 in the transverse direction, preferably less than 0.25, 0.20, 0.15, and 0.10.

In Table 7, three additional three-layer films of the invention are compared with a control, D-955 film, labeled "Comp.2" in the Table. Comp.2 was equivalent in composition and construction to Comp.1 of Table 5. These were each made by a coextrusion of the layers, and each had the structure:

A/B/A

The thickness ratio of the layers was:

TABLE 7

| layer A | layer B | layer A |
|---|---|---|
| 1 | 3 | 1 |

All the films were biaxially oriented at 5×6 in the machine and transverse directions respectively. All films were irradiated at an absorbed dosage of between 20 and 80 K Gy. The B layer of the films was a blend of 60% $PE_1$ and 40% $PE_2$. The A layers of the films were as identified for each example in Table 7. The masterbatch comprised 90% $PE_2$ and 10% slip and antiblock additives.

TABLE 7

| | |
|---|---|
| 75 | 45% $PE_2$ + 40% $PE_4$ + 15% Masterbatch |
| 76 | 45% $PE_2$ + 40% $PE_4$ + 15% Masterbatch |
| 77 | 40% $PE_2$ + 40% $EV_1$ + 20% Masterbatch |

TABLE 8

| Physical Property | Comp. 2 | Ex. 75 | Ex. 76 | Ex. 77 |
|---|---|---|---|---|
| Film thickness (gauge) | 60 | 30 | 30 | 30 |
| Modulus$^c$ (psi × 1000) | | | | |
| LD | 72.2 | 77.8 | 71.8 | 82.8 |
| TD | 70.8 | 94.3 | 71.1 | 85.2 |
| Free Shrink$^e$ (%) | | | | |
| @220° F. | | | | |
| LD | 34 | 20 | 28 | 25 |
| TD | 40 | 28 | 33 | 32 |
| @240° F. | | | | |
| LD | 64 | 43 | 55 | 48 |
| TD | 63 | 50 | 56 | 53 |
| @260° F. | | | | |
| LD | 82 | 80 | 80 | 81 |
| TD | 76 | 80 | 76 | 78 |
| Shrink Tension$^f$ (psi) | | | | |
| @260° F. | | | | |
| LD | 608 | 477 | 543 | 506 |
| TD | 408 | 507 | 599 | 524 |
| Shrink Force$^f$ (pounds) | | | | |
| @220° F. | | | | |
| LD | 0.35 | 0.10 | 0.14 | 0.14 |
| TD | 0.32 | 0.18 | 0.17 | 0.18 |
| @240° F. | | | | |
| LD | 0.38 | 0.14 | 0.16 | 0.16 |
| TD | 0.30 | 0.18 | 0.18 | 0.19 |
| @260° F. | | | | |
| LD | 0.39 | 0.15 | 0.19 | 0.18 |
| TD | 0.26 | 0.17 | 0.17 | 0.17 |

The film of the present invention can have a thickness of between 0.10 mils and 15 mils, but preferred thicknesses are less than 2 mils, preferably less than 1.5 mils such as 1 mil, and more preferably less than 0.70 mils. More preferably, the film is less than 0.60 mils thick, such as 0.55, 0.50, 0.45, 0.40, 0.35, 0.30, and 0.25 mils thick.

The film of the present invention can have a modulus of preferably at least 60,000 psi in the longitudinal direction (LD). More preferably, the modulus is at least 65,000 psi, more preferably at least 70,000 psi in the LD, such as 75,000, 80,000, 90,000, 95,000, 100,000 psi and higher. A preferred range is between 60,000 and 100,000 psi, more preferably between 65,000 and 95,000, more preferably between 70,000 and 90,000 psi, such as between 75,000 and 85,000 psi in the LD. At modulus values above 120,000, the film can still be useful, but tear properties of the film can degrade significantly.

The film of the present invention can have a modulus of preferably at least 75,000 psi in the transverse direction (TD). More preferably, the modulus is at least 80,000 psi, more preferably at least 85,000 psi in the TD, such as 90,000, 95,000, 100,000, 105,000, 110,000, 115,000, and 120,000 psi. A preferred range is between 75,000 and 120,000 psi, more preferably between 80,000 and 115,000, more preferably between 85,000 and 110,000 psi, such as between 90,000 and 105,000 psi, and between 95,000 and 100,000 psi in the TD.

Too low a modulus will result in difficulty in using the film in some high speed packaging equipment, especially for thinner embodiments of the inventive film. Too high a modulus will result in a greater tendency for tear propagation The film of the present invention can have any suitable number of layers; can be a monolayer film, or have 2,3,4, 5,6,7,8,9, or more layers. Films can be symmetric or asymmetric in construction. For example, a film of the invention can have one of the following constructions:

LMDPE/LMDPE+EVA
LMDPE+EVA/LMDPE/LLDPE/LMDPE+EVA
LMDPE/LMDPE+HEAO
LMDPE+HEAO/LMDPE/LLDPE/LMDPE+HEAO
HDPE/HDPE+EVA
HDPE+EVA/HDPE/LLDPE/HDPE+EVA
HDPE/HDPE+HEAO
HDPE+HEAO/HDPE/LLDPE/HDPE+HEAO

Layer gauges can vary, even between layers with similar composition.

Films of the invention can utilize different materials for the outer layers or for the intermediate layers, so that e.g. the two "A" layers can be different from each other in composition, degree of crosslinking, thickness, or other parameters. A structure such as 70% LMDPE+30% EVA/LLDPE/LMDPE/VLDPE/90% HDPE+10% HEAO is therefore within the scope of the invention.

If oriented, the film can be oriented either monoaxially or biaxially. Orientation ratios preferably range from 2:1 to 10:1 in each direction, more preferably 2.5:1 to 9:1, such as 3:1 to 8:1, 4:1 to 7:1, 4.5:1 to 6:1, and 5.5:1 in each direction.

What is claimed is:

1. A multilayer film comprising
   a) a core layer comprising an ethylene polymer having a density of at least 0.925 grams per cubic centimeter; and
   b) two outer layers each comprising a blend of:
      i) an ethylene polymer having a density of at least 0.930 grams per cubic centimeter, and
      ii) an ethylene copolymer selected from the group consisting of a copolymer of ethylene and a $C_4$ to $C_{10}$ alpha-olefin, and ethylene/ester copolymer;
         wherein at least one of said outer layers comprises less than 30% linear low density polyethylene;
         wherein the ethylene polymer having a density of at least 0.930 grams per cubic centimeter comprises between 40% and 69% of the blend of each of the two outer layers; and
         wherein said film has a shrink force of less than 0.35 pounds in the longitudinal direction, and less than 0.30 pounds in the transverse direction.

2. The film of claim 1 wherein the ethylene polymer having a density of at least 0.925 grams per cubic centimeter, of the core layer, is selected from the group consisting of linear medium density polyethylene and high density polyethylene.

3. The film of claim 1 wherein the ethylene copolymer is selected from the group consisting of ethylene/ester copolymer, and homogeneous ethylene/alpha-olefin copolymer.

4. The film of claim 1 wherein the film is crosslinked.

5. The film of claim 1 wherein the film is heat shrinkable.

6. The film of claim 1 wherein the film has a thickness of less than 0.50 miss.

* * * * *